Patented July 22, 1941

2,250,129

UNITED STATES PATENT OFFICE 2,250,129

AZO DYESTUFFS AND METHOD FOR THEIR MANUFACTURE

Georges Kopp and René Eugène Marcel Gangneux, Rouen, France, assignors to Compagnie Nationale de Matieres Colorantes et Manufactures de Produits Chimiques du Nord Reunies, Etablissements Kuhlmann, Paris, France, a corporation of France No Drawing. Application January 3, 1939, Serial No. 249,158. In France January 10, 1938

1 Claim. (Cl. 260—196)

Our invention is concerned with azo-dyestuffs and methods for making them.

It is well known that it is possible to use for dyeing cellulose acetate rayon silk certain aminated derivatives of the benzene-azo-naphtalene and that these dyestuffs can be diazotized on the fibre and developed on the latter by means of constituents such as the 2-naphtol-3-carbonic acid.

Our present invention has for its object the preparation and use, for dyeing cellulose ester fibres, of amino-azo-dyestuffs having the following general formula:

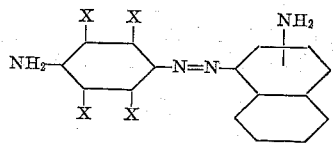

in which one of the X's stands for a halogen atom, the other X for halogen or hydrogen atoms and in which the NH₂ group which is fixed to the naphtalenic core is in the ortho or para position with respect to the azo-group.

These dyestuffs have an excellent affinity for the cellulose esters and are particularly suitable for dyeing rayon silks of esterified celluloses in permanent colours.

The production of these dyestuffs is effected from halogenated derivatives of paranitraniline, paraphenylene-diamine or monoacylparaphenylene-diamine.

It is possible, for instance, to start from the diazo compounds of the halogenated derivatives of the para-nitraniline, which diazo compounds are coupled with the alpha or the beta-naphtylamine; nitrated aminoazo dyestuffs are thus intermediarily obtained which dye cellulose acetate rayon silks directly in red and bordeaux shades. These intermediary dyestuffs, when submitted to reductions provided by any known means, are converted into diaminated derivatives corresponding to the above given general formula.

The coupling of the monodiazo compounds of the halogenated para-phenylene-diamines with the alpha or the beta-naphtylamine directly supplies the diaminated dyestuffs in question.

The new dyestuffs, eventually dispersed, dye the cellulose acetate in all its forms in yellow, orange-coloured and brown shades. When diazotized in nature or on the fibre and developed through usual coupling components such as the 2-naphthol-3-carbonic acid, they give polyazo dyestuffs of green-black shades of excellent fastness. The blacks obtained by development with the 2-naphthol-3-carbonic acid are more greenish and more resisting to light than those which have been described till now.

The following forms of execution of our invention are given, of course, as non limitative examples.

Example 1

172 parts of ortho-chloro-paranitraniline are diazotized at 0° C. by means of 400 parts of hydrochloric acid at 35%, 1000 parts of water, 500 parts of ice and 70 parts of sodium nitrite. To the filtrated diazo solution then is slowly added the solution of 143 parts of alphanaphtylamine in 1000 parts of boiling water and 100 parts of hydrochloric acid at 35%. The coupling being completed, the dyestuff is filtrated. It is submitted to a partial reduction by means of an alkaline sulphide and anew isolated by filtration. The diamino-azo dyestuff which is thus obtained possesses a strong affinity for cellulose acetate rayon silks. In order to facilitate its application it is ground with a dilution product having dispersing properties. When dyed on rayon silk and developed after diazotization with 2-naphthol-3-carbonic acid, the new dyestuff gives a deep green-black shade, which is very resisting to light.

Example 2

210 parts of dihydrochlorate of mono-chloro-para-phenylene-diamine are dissolved in 2000 parts of water. 400 parts of hydrochloric acid at 35% are added and one cools to —5° C. There is very slowly poured, under strong stirring, a solution containing 70 parts of sodium nitrite. The diazotization being completed one adds a solution of 143 parts of alpha-naphtylamine in 1000 parts of boiling water and 150 parts of hydrochloric acid at 35%. The excess of mineral acid is weakened by a prudent or careful addition of sodium acetate. The reaction mixture is heated and maintained at +50° C. for 48 hours. The dyestuff is filtered and treated with diluted hydrochloric acid for removing the eventual excess of naphtylamine.

This dyestuff dyes on rayon silk: when diazotized and developed as the dyestuff of Example 1, it gives green-black shades which are of excellent fastness to light.

Example 3

In the foregoing example, the diazotizable basis is replaced by 177 parts of symmetrical dichloroparaphenylenediamine.

The dyestuff obtained under these conditions provides a special interest because of the far greenish black which is very resisting to light, obtainable on the fibre by diazotization and development with 2-naphtol-3-carbonic acid. The degrading action of light, even when protracted, produces no turning towards red.

*Example 4*

In the Example 1, the chloroparanitraniline is replaced by 217 parts of orthobromoparanitraniline. The dyestuff thus obtained gives, when dyed on cellulose acetate rayon silk, results which are very nearly similar to those according to Example 1.

*Example 5*

In the Example 2, the monochloropara-phenylene-diamine is replaced by 247 parts of tetrachloroparaphenylene-diamine.

The new dyestuff, when dyed and developed in the conditions precized in Example 1, gives a fast green-black shade.

*Example 6*

In the Example 3, the alphanaphtylamine is replaced by the same quantity of betanaphtylamine. A dyestuff is produced which, when dyed on rayon silk, diazotized and developed by means of 2-naphtol-3-carbonic acid, gives black shades of excellent fastness.

*Example 7*

100 parts of the dyestuff of the Example 3 are thoroughly mixed with 200 parts of water and 60 parts of a dispersing agent resulting from the condensation of a mixture of phenol, formol and sulphuric acid. After drying and grounding, this dyestuff can be applied in the following manner:

1 part of dispersed dyestuff is suspended in 1000 parts of warm water containing 5 parts of neutral soap and 5 parts of sodium sulphate. At 50° C., 50 parts of cellulose acetate rayon silk threads are introduced into this emulsion and one dyes for 1 hour while raising the temperature progressively up to 75° C. The rayon silk is coloured in yellowish brown.

When diazotized and developed by means of 2-naphtol-3-carbonic acid according to the usual method, the dyestuff turns to very greenish black, which is far resisting to light.

What we claim is:

A method for producing amino-azo-dyestuffs of the general formula

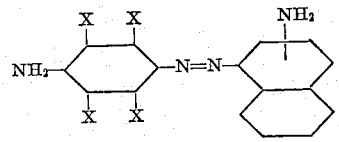

in which one of the X's stands for a halogen atom, the other X being members of the group consisting of the halogen and hydrogen atoms and in which the $NH_2$ group which is fixed to the naphtalenic nucleus is in one of the ortho and para positions with respect to the azo group, which consists in monodiazotizing a halogenated paranitraniline, in coupling the obtained diazo derivative with a naphtylamine and in reducing the nitro group of the amino-azo-compound.

GEORGES KOPP.
RENÉ EUGÈNE MARCEL GANGNEUX.